(12) United States Patent
De Saint Romain

(10) Patent No.: US 10,144,216 B2
(45) Date of Patent: Dec. 4, 2018

(54) METHOD FOR MANAGING INK QUALITY OF AN INKJET PRINTER VERSUS TEMPERATURE

(71) Applicant: Markem Imaje Holding, Bourg les Valence (FR)

(72) Inventor: Pierre De Saint Romain, Valence (FR)

(73) Assignee: MARKEM-IMAJE HOLDING, Bourg-les-Valence (FR)

(*) Notice: Subject to any disclaimer, the term of this patent is extended or adjusted under 35 U.S.C. 154(b) by 0 days.

(21) Appl. No.: 14/844,532

(22) Filed: Sep. 3, 2015

(65) Prior Publication Data

US 2016/0067962 A1 Mar. 10, 2016

(30) Foreign Application Priority Data

Sep. 4, 2014 (FR) .................................. 14 58284

(51) Int. Cl.
*B41J 2/045* (2006.01)
*B41J 2/175* (2006.01)
(Continued)

(52) U.S. Cl.
CPC ....... *B41J 2/04563* (2013.01); *B41J 2/04571* (2013.01); *B41J 2/175* (2013.01);
(Continued)

(58) Field of Classification Search
CPC ........ B41J 2/195; B41J 2/04563; B41J 2/175; B41J 2/04571; C09D 11/38; C09D 11/30
See application file for complete search history.

(56) References Cited

U.S. PATENT DOCUMENTS 6,001,529 A * 12/1999 Imai ..................... B41J 2/4753
430/138
6,450,601 B1 9/2002 Pagnon
(Continued)

FOREIGN PATENT DOCUMENTS

EP 0 142 265 A1 5/1985
EP 0 333 325 A2 9/1989
(Continued)

OTHER PUBLICATIONS

Search Report issued in French Patent Application No. FR 14 58284 dated Apr. 28, 2015.
(Continued)

*Primary Examiner* — Yaovi M Ameh
(74) *Attorney, Agent, or Firm* — Pearne & Gordon LLP

(57) ABSTRACT

A method for managing the quality of an ink of an inkjet printer versus temperature resorting to the management of the viscosity of the ink versus temperature, the ink comprising a solvent or a mixture of solvents and the solvent or mixture of solvents representing at least 50% by mass of the total mass of the ink, wherein the viscosity of the ink at a temperature T is calculated from the following parameters: the viscosity of the ink at a single reference temperature $T_{ref}$; the parameters K or Ln(K), and −E/R of equation (1) giving the viscosity of the solvent or of the mixture of solvents: Ln (viscosity of the solvent)=Ln(K)−E/RT (1) wherein E is the Arrhenius activation energy given in J/mol and R is the ideal gas constant.

13 Claims, 13 Drawing Sheets

(51) Int. Cl.
*B41J 2/195* (2006.01)
*C09D 11/30* (2014.01)
*C09D 11/38* (2014.01)

(52) U.S. Cl.
CPC ............ *B41J 2/195* (2013.01); *C09D 11/30* (2013.01); *C09D 11/38* (2013.01)

(56) References Cited

U.S. PATENT DOCUMENTS

| | | | |
|---|---|---|---|
| 2011/0108124 A1* | 5/2011 | Bonner | B05B 12/10 |
| | | | 137/2 |
| 2012/0007906 A1* | 1/2012 | Zhang | B41J 2/04553 |
| | | | 347/14 |
| 2013/0063504 A1 | 3/2013 | Shimizu | |
| 2013/0202861 A1* | 8/2013 | Ohta | B41M 5/0017 |
| | | | 428/205 |
| 2014/0050868 A1 | 2/2014 | De Saint-Romain | |
| 2014/0065381 A1 | 3/2014 | De Saint Romain | |

FOREIGN PATENT DOCUMENTS

| | | | |
|---|---|---|---|
| EP | 1 048 470 A1 | 11/2000 | |
| EP | 2 636 884 A1 | 9/2013 | |
| GB | 2471395 A | 12/2010 | |
| WO | 2012/066360 A1 | 5/2012 | |
| WO | WO 2012066360 A1 * | 5/2012 | ............ B41J 2/175 |
| WO | 2013/175225 A1 | 5/2013 | |

OTHER PUBLICATIONS

U.S. Appl. No. 14/763,927, "Ink Composition for Liquid Jet Printing" filed Jul. 28, 2015.

* cited by examiner

METHOD FOR MANAGING INK QUALITY OF AN INKJET PRINTER VERSUS TEMPERATURE

TECHNICAL FIELD

The present invention relates to a method for managing the quality of the ink of an inkjet printer, more specifically of a continuous deflected inkjet printer versus temperature.

STATE OF THE PRIOR ART

In an inkjet printer using the principle of a continuous deflected jet, the ink not used for printing is recycled. However, the recovered ink does not have the same properties as the ink emitted in the jet, mainly because of evaporation of solvent.

Two documents, i.e. documents EP-A2-0 333 325 [1] and EP-A1-0 142 265 [2], describe methods for controlling the drift in the quality of the ink.

The evaporation of the solvent should actually be compensated by exactly adding the amount of evaporated solvent in order to keep the quality of the ink constant. In order to ensure servo-control of this solvent addition without any fluctuation ("pumping"), the evaporation rate should be taken into account.

Document [1] takes into account the measurement of the emptying time, by the inkjet, of a calibrated volume. A temperature sensor enables the taking into account of the natural influence of temperature on the quality of the ink. The temperature actually acts on the viscosity and on the specific gravity of the ink. The achieved servo-control uses a temperature-dependent emptying curve. A reference point is established upon starting the machine in order to take into account dispersions between the different contemplated applications. In document [2], the machine used is equipped with a specific device (ball viscosimeter) giving the possibility of determining the viscosity of the ink of the machine. A viscosity/temperature curve expresses the set operating value.

However, the time-dependent change in the specific gravity of the ink is absolutely not considered. This method is independent of the inkjet and does not involve the operating pressure. This machine works at constant pressure and does not ensure constant writing quality over a large temperature range. Further, such an achievement is of a high cost because of the use of a solenoid valve, a calibrated ball, detectors, piping . . .

Another method is described in document FR-A1-2 636 884 [3].

This method is based on the time-dependent change in the operating pressure versus the temperature of the ink by imposing a constant jet speed.

This method not only ensures a servo-control of the ink quality but further gives the possibility of having a printing quality independent of temperature, by means of a constant jet speed. It also achieves a measurement of the speed of the jet. The operating curve, which constitutes the set value of the quality of the ink, both takes into account the viscosity and the specific gravity of the ink. This method requires the intervention of the operator and the establishment of the reference pressure is achieved by varying the operating temperature of reference machines.

Document EP-A1-1 048 470 [4], also published as U.S. Pat. No. 6,450,601 B1 describes a method for managing the ink quality in an inkjet printer, in which information on the ink pressure P, temperature T and jet speed V, and a desired pressure value curve $P_{setvalue}$ ("Pconsigne") as a function of temperature T and speed V, are available for each of the inks qualified for this printer model. Therefore it is noted that the management of the quality of the ink of an inkjet printer versus temperature often resorts to the management of the viscosity of the ink versus temperature. The viscosity of the ink of an inkjet printer depends on the constituents which enter into the composition of the ink.

Thus, the inks for inkjet printers generally contain a solvent or a mixture of solvents in which are dissolved or dispersed, coloring materials, binders, generally polymeric binders, and various other additives in minor amounts.

The binders have the function of coating the coloring materials and of having the ink adhere on the various supports to be marked. The binders have the effect of increasing the viscosity of the solvent or of the mixture of solvents.

The solvent(s) may be water or any kinds of organic solvents with different volatility depending on the goal set by the formulator.

Many inks have the same solvents while these inks moreover have quite different compositions of binders and coloring materials.

The management of the viscosity of the inks by inkjet printers requires storing in memory the viscosity of each ink used or which may be used in the printer versus temperature.

It is therefore necessary to establish reference curves for each of these inks and then to store these curves in the memory of the printer. This is the case in documents [1], [2], [3], [4], mentioned above.

Establishing these curves requires the carrying out of a large number of measurements of viscosity versus temperature for each of these inks. The number of inks used for an inkjet printer may be large which multiplies by as much the number of measurements to be conducted.

The operation which consists of programming the memories of printers with such a large amount of informations specific to each of the inks used is also long and tedious.

Further, every time a new ink is used in the printer, the specific curve giving the viscosity of this specific ink versus temperature has to be established and the thereby collected data have to be introduced into the memory of the printer.

Therefore, considering the foregoing, there exists a need for a method for managing the quality of the ink of an inkjet printer versus temperature by resorting to the management of the viscosity of the ink versus temperature which does not require the establishment of reference curves giving the viscosity versus temperature for each of the specific inks used or which may be used in the printer, as well as the storage of these curves into the memory of the printer.

The goal of the present invention is, inter alia, to provide a method for managing the quality of the ink of an inkjet printer versus temperature by resorting to managing the viscosity of the ink versus temperature, which meets this need.

SUMMARY OF THE INVENTION

This goal, and further other ones, are achieved, according to the invention by a method for managing the quality of an ink of an inkjet printer versus temperature resorting to the management of the viscosity of the ink versus temperature, said ink comprising a solvent or a mixture of solvents, and said solvent or mixture of solvents representing at least 50% by mass of the total mass of the ink, wherein the viscosity of the ink at a temperature T is calculated from the following parameters:

the viscosity of the ink at a single reference temperature $T_{ref}$;

the parameters K or Ln(K), and −E/R of the equation giving the viscosity of the solvent or of the mixture of solvents: Ln (viscosity of the solvent)=Ln(K)−E/RT (1), wherein E is the Arrhenius activation energy given in J/mol and R is the ideal gas constant.

The usual value of R is $8.314472 \, Pa \cdot m^3 \cdot K^{-1} \cdot mol^{-1}$.

Advantageously, the calculated viscosity of the ink may further be corrected by using a fourth parameter, a so-called correction factor k.

Generally, the ink may comprise a solvent or a mixture of solvents, one or several coloring material(s), optionally one or several binder(s), and optionally one or several additive (s).

The ink may comprise from 40% to 99%, preferably from 50% to 95%, still preferably from 60% to 90% by mass of the solvent or of the mixture of solvents based on the total mass of the ink.

Advantageously, the viscosity of the ink at the reference temperature is obtained by a measurement carried out in a laboratory.

Preferably, the reference temperature $T_{ref}$ is 20° C.

Advantageously, the equation giving the viscosity of the solvent or the mixture of solvents:

$$Ln(\text{viscosity of the solvent}) = Ln(K) - E/RT \quad (1)$$

may be determined by measuring the viscosity of the solvent or of the mixture of solvents at several temperatures located in the range of operating temperatures of the printer, for example from 0° C. to 50° C., or extracted from the literature.

Advantageously, the viscosity of the ink at the temperature T is calculated by multiplying the viscosity of the ink at the reference temperature by the ratio of the viscosity of the solvent at temperature T to the viscosity of the solvent or of the mixture of solvents at the reference temperature.

Advantageously, the viscosity of each of the inks used in the printer at the reference temperature $T_{ref}$ and the parameters K or Ln(K), and −E/R of the equation giving the viscosity of the solvent or of the mixture of solvents of each of said inks may be stored in the machine memory of the printer, and the curve of variation of the viscosity of the ink in the range of operating temperatures of the printer is established.

If higher accuracy is desired, then the viscosity of the ink at temperature T may be calculated by multiplying the viscosity of the ink at the reference temperature $T_{ref}$ by the ratio of the viscosity of the solvent or of the mixture of solvents at temperature T to the viscosity of the solvent or of the mixture of solvents at the reference temperature and further by $(1-k(T-T_{ref}))$ wherein k is the correction factor.

Advantageously, the correction factor k may have a value comprised between 0 and 0.02, preferably between $5 \cdot 10^{-3}$ and $10^{-2}$, for example 0.0047, rounded to 0.005.

Advantageously, the correction factor k is determined in the laboratory in the following way:

the viscosity of each of the inks of the set of inks used in a printer, is measured at two temperatures at least, including the reference temperature $T_{ref}$ selected in the range of operating temperatures of the printer;

the viscosity of each of the inks of the set of inks used in the printer, is calculated at said at least two temperatures, selected in the range of operating temperatures of the printer;

for each ink and each temperature at which the viscosity was measured and calculated, a correction factor ki is determined, this correction factor ki being such that when the calculated viscosity of the ink is multiplied by $(1-k_i)$ the measured viscosity is obtained;

all the factors ki determined for all the temperatures and for all the inks of the set of inks are averaged, whereby the factor k is obtained.

Generally, the correction factor k is determined in the laboratory and the viscosity of each of the inks is measured in the laboratory.

As the correction factor k was determined for a given set of inks, considered as representative of the inks used in a given printer, it is not necessary to recalculate k when a new ink is used in this printer, it is sufficient to use the already calculated value of k.

Advantageously, the correction factor k may also be stored in the machine memory of the printer.

The management of the viscosity of the ink may be achieved in the following way:

During the operation of the printer, the viscosity and the temperature T of the ink are measured, the viscosity of the ink measured at temperature T is compared with the viscosity of the ink calculated at the same temperature T, and:

if the measured viscosity of the ink is greater than the calculated viscosity of the ink, an addition of solvent or of a mixture of solvents into the ink is then ordered so that the measured viscosity of the ink is equal to the calculated viscosity of the ink; or else if the measured viscosity of the ink is less than the calculated viscosity of the ink (therefore there has been a too large addition of solvent or of a mixture of solvents), then one waits for the time required so that the solvent or the mixture of solvents evaporates and so that the measured viscosity of the ink is equal to the calculated viscosity of the ink.

In other words, if the measured viscosity during operation deviates from the calculated, theoretical viscosity curve, this means that the variation of viscosity, is not «normal», does not originate from the variation of temperature, but rather originates from a loss of solvent or of a mixture of solvents by evaporation (case when the viscosity increases) or from a too large addition of solvent (case when the viscosity decreases).

The method according to the invention has never been described in the prior art as notably represented by the documents mentioned above.

The method according to the invention meets the needs as stated above.

In the method according to the invention, the viscosity of the ink at a temperature T is calculated from only three parameters, i.e. the viscosity of the ink at a single reference temperature $T_{ref}$ and the parameters K or Ln(K), and −E/R of the equation giving the viscosity of the solvent or of the mixture of solvents.

Optionally, a fourth parameter, a so-called correction factor k may be used. This correction factor may be the same for all the inks.

It becomes unnecessary according to the invention, in the most general case when the correction factor k is not used, to measure the viscosity of each ink over the whole range of operating temperatures of the printer and to store these values into the memory of the printer.

It is sufficient to store in the machine memory of the printer, the viscosity of each of the inks used or which may be used in the printer at the reference temperature $T_{ref}$ and the parameters K or Ln(K), and −E/R of the equation giving the viscosity of the solvent or of the mixture of solvents of each of said inks.

In other words, and to summarize, in the method according to the invention, the viscosity of the ink at the reference temperature is measured once and for all in the laboratory.

The viscosity of the solvent as a function of temperature is also measured once and for all in the laboratory and the parameters K and $-E/R$ are calculated from said experimental values.

The ordinate at the origin of the curve defined by equation $Ln(\text{viscosity of the solvent})=Ln(K)-E/RT$ (1) gives $Ln(K)$, and the slope of said curve gives $-E/R$.

K is also called "preexponential factor" because said equation (1) can also be written: viscosity of the solvent=$K \cdot exp(-E/RT)$.

Once the calculation parameters (viscosity of the ink at the reference temperature, and parameters K and $-E/R$ for the solvent) have been stored in the memory of the printer, the printer can then recalculate the viscosity the ink should have at the temperature T at which the ink (and generally the printer) is, at any time, and thus can adjust said viscosity, for example by the required additions of solvent or mixture of solvent.

The temperature T of the ink is generally measured by the printer using temperature measuring means such as a thermocouple or several thermocouples.

One of the specific interests, advantages of the method according to the invention is that several inks may comprise the same solvent or mixture of solvents.

With the method according to the invention, it is not necessary to measure the viscosity of said several inks as a function of temperature, it is only necessary to measure the viscosity of the solvent or of the mixture of solvents common to all said inks.

The calculation of the viscosity of the ink at the temperature T measured by the printer, during operation thereof is carried out as follows:

Multiply the viscosity of the ink at the reference temperature by the viscosity of the solvent at the temperature T measured by the printer, and divide the result of said multiplication by the viscosity of the solvent at the reference temperature.

A slope correction factor may be further applied by multiplying the result of the above division by $(1-k(T-Tref))$, wherein k is for example 0.0047, rounded to 0.005.

The method according to the invention is simple, reliable, is suitable for all inks, regardless of whether the base solvent is for example water, alcohol, MEK or mixtures of these solvents or of others and regardless of the other ingredients of the ink.

The method according to the invention may be applied with an inkjet printer comprising a recovery tank, devices for adding solvent and for adding ink driven by a control unit by means of solenoid valves, pressure, temperature and jet velocity sensors at the output of the printer head connected to this control unit, a pressure regulator.

The invention will be better understood upon reading the detailed description which follows, notably made in connection with particular embodiments in the form of examples.

The given proportions are proportions by mass.

Figure 1:
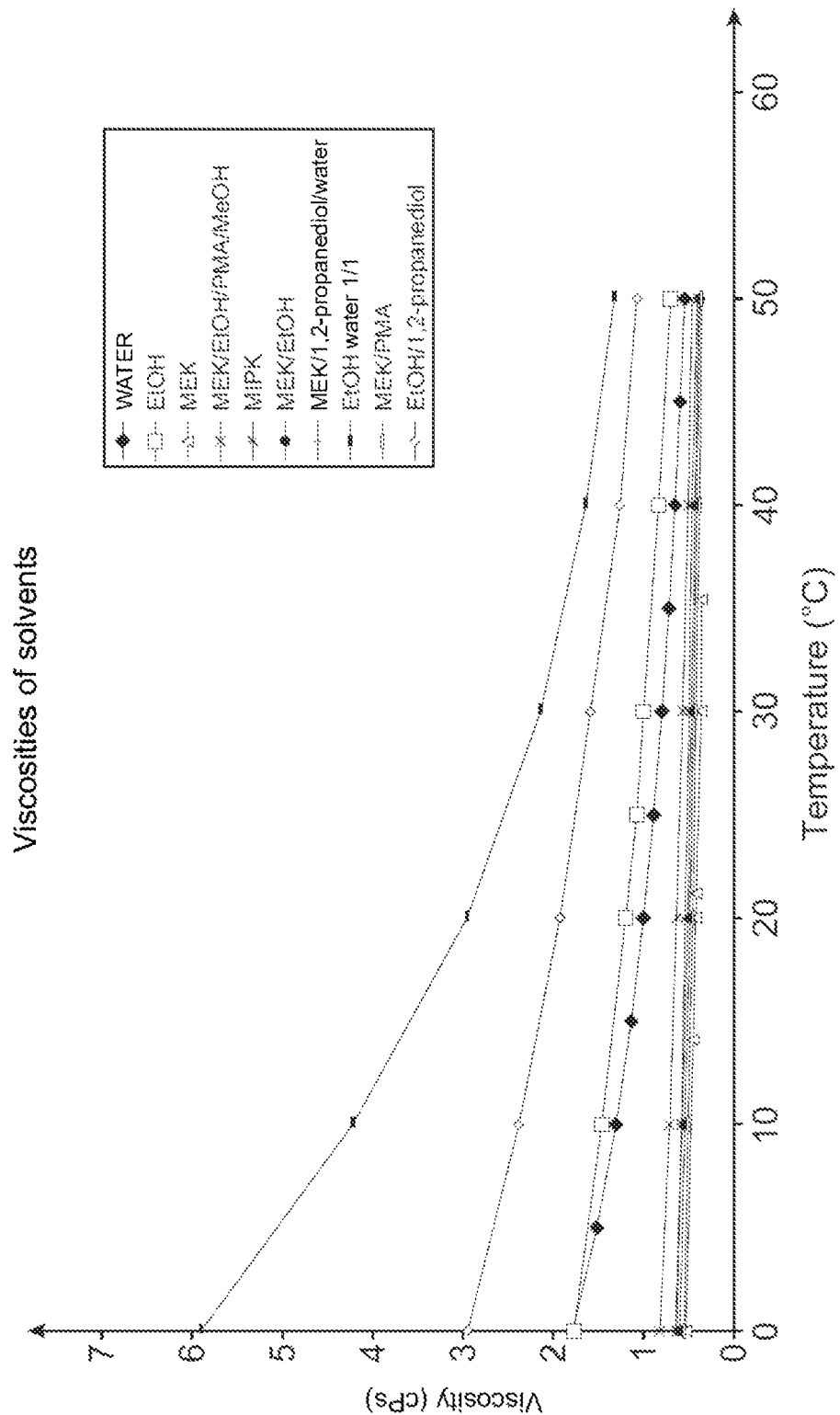
FIG. 1 is a graph which gives the viscosity (in cPs) versus temperature (° C.) of 10 solvents or mixtures of solvents presently used in inks for inkjet printers, i.e. water, ethanol (EtOH), methyl ethyl ketone (MEK), MEK/EtOH/PMA (methoxypropanol acetate)/methanol (MeOH) mixture (proportions: 68/26.6/1/4.4), methyl isopropyl ketone (MIPK), MEK/EtOH mixture (28/72), MEK/1,2-propanediol/water mixture, EtOH/water mixture (1/1), MEK/PMA (methoxypropanol acetate) mixture (89/11), EtOH/1,2-propanediol mixture (88/11).
Figure 2:
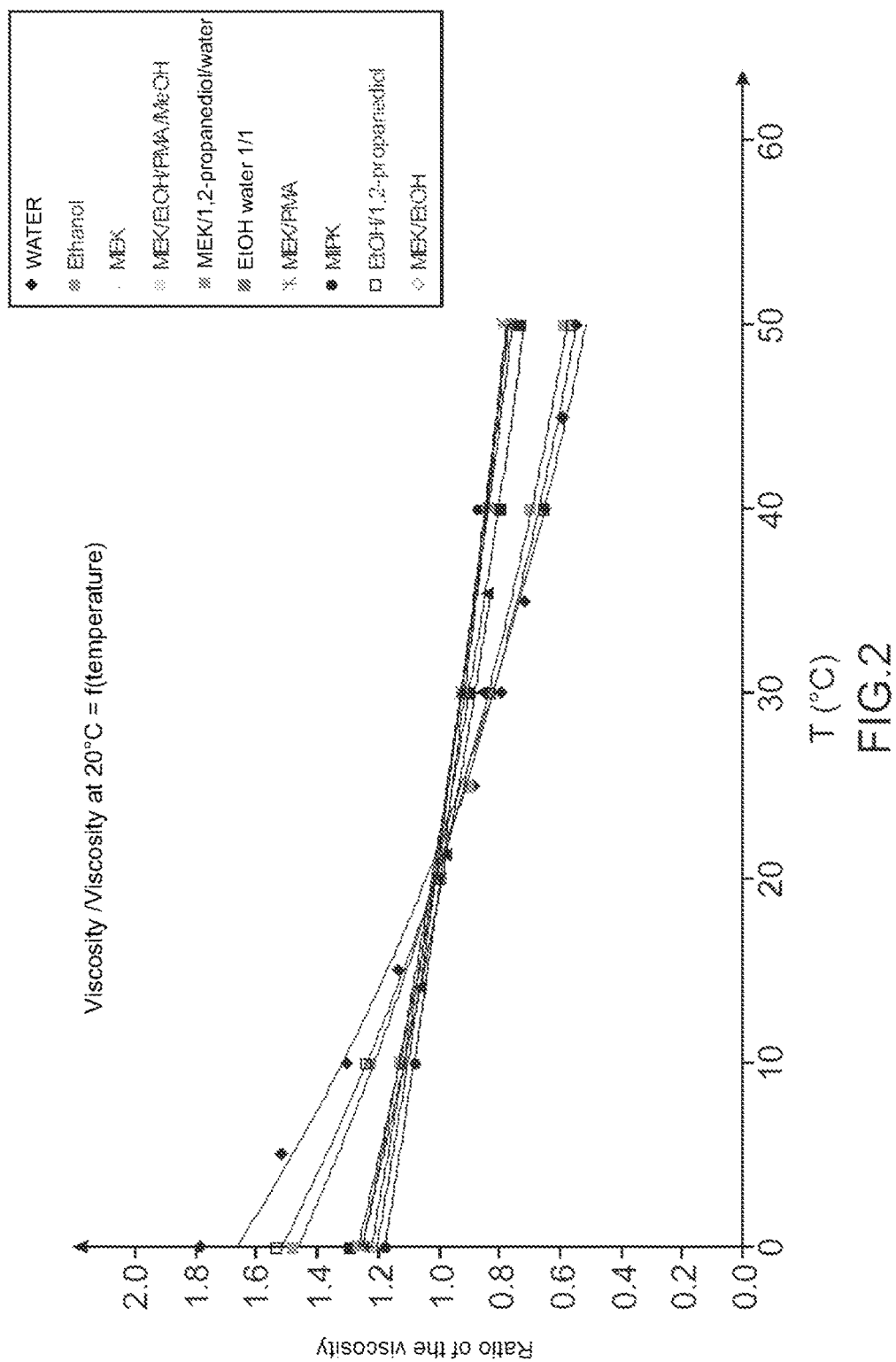

FIG. 2 is a graph which gives the viscosity at temperature T/viscosity at 20° C. ratio versus temperature T (in ° C.) of the 10 same solvents or mixtures of solvents as those of FIG. 1.

Figure 3:
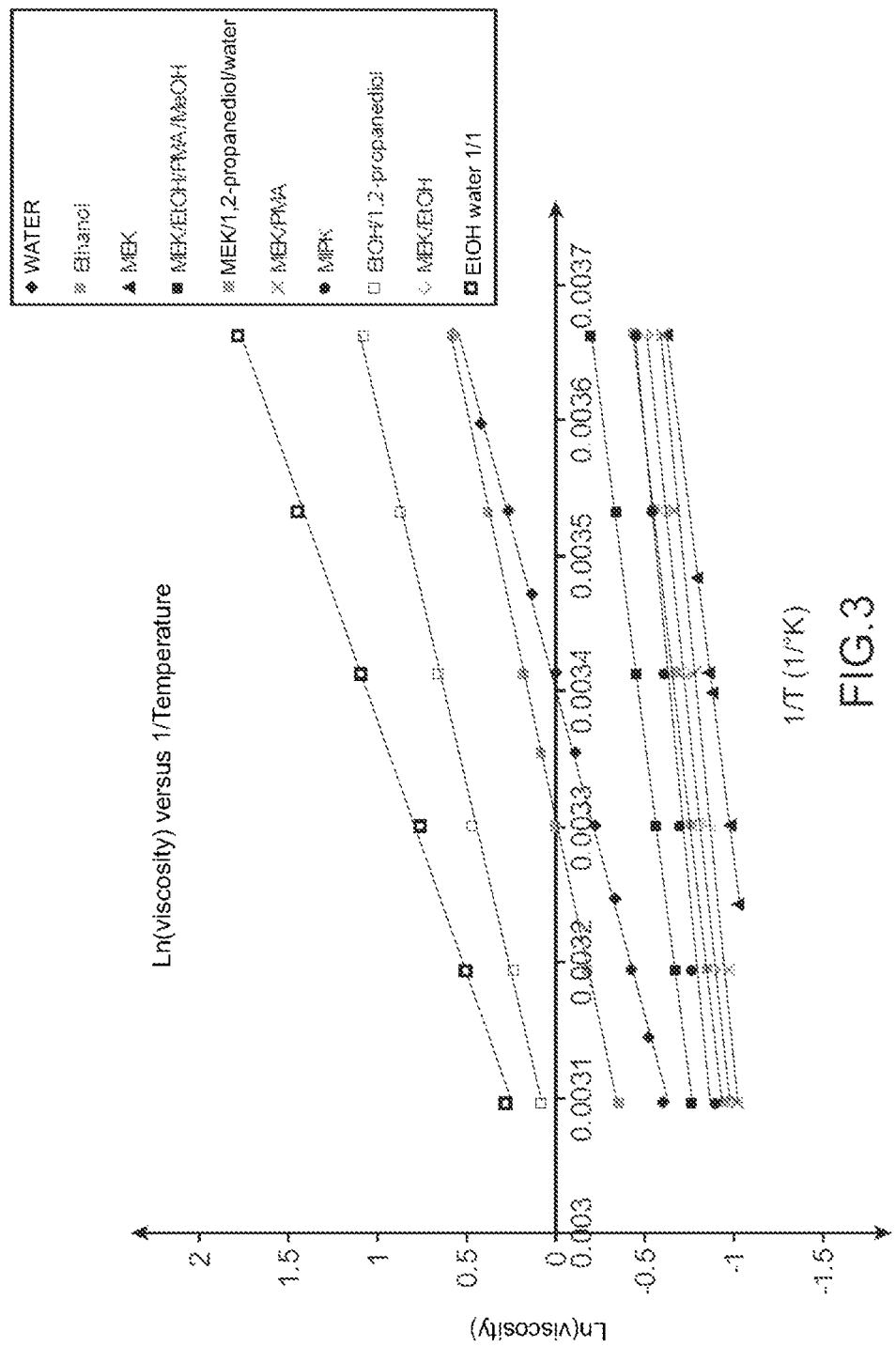

FIG. 3 is a graph which gives the Ln (viscosity) versus 1/T (in K) of the 10 same solvents or mixtures of solvents like those of FIG. 1.

Figure 4:
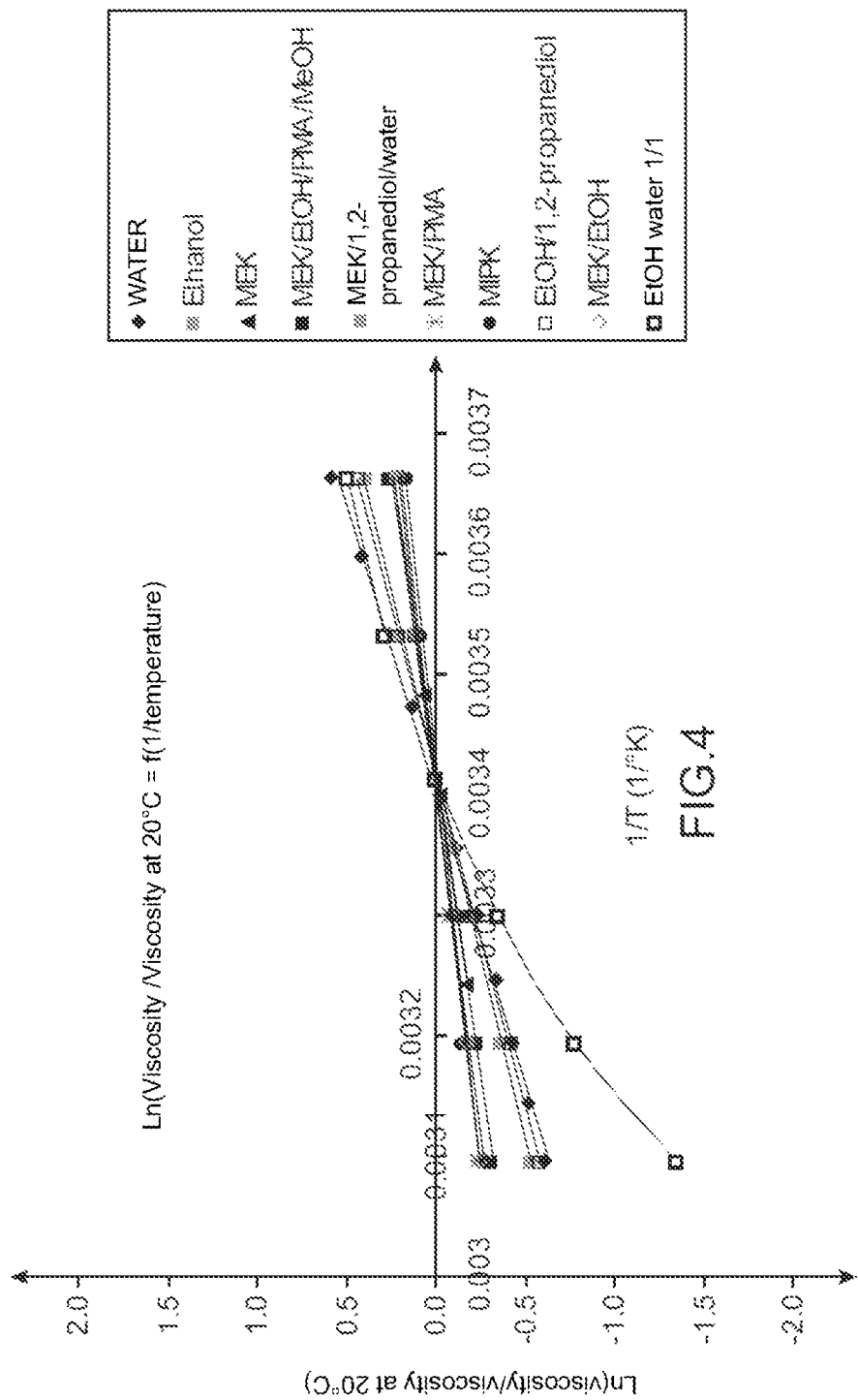

FIG. 4 is a graph which gives the Ln (viscosity at T/viscosity at 20° C.) versus 1/T (in K) of the 10 same solvents or mixtures of solvents like those of FIG. 1.

Figure 5:
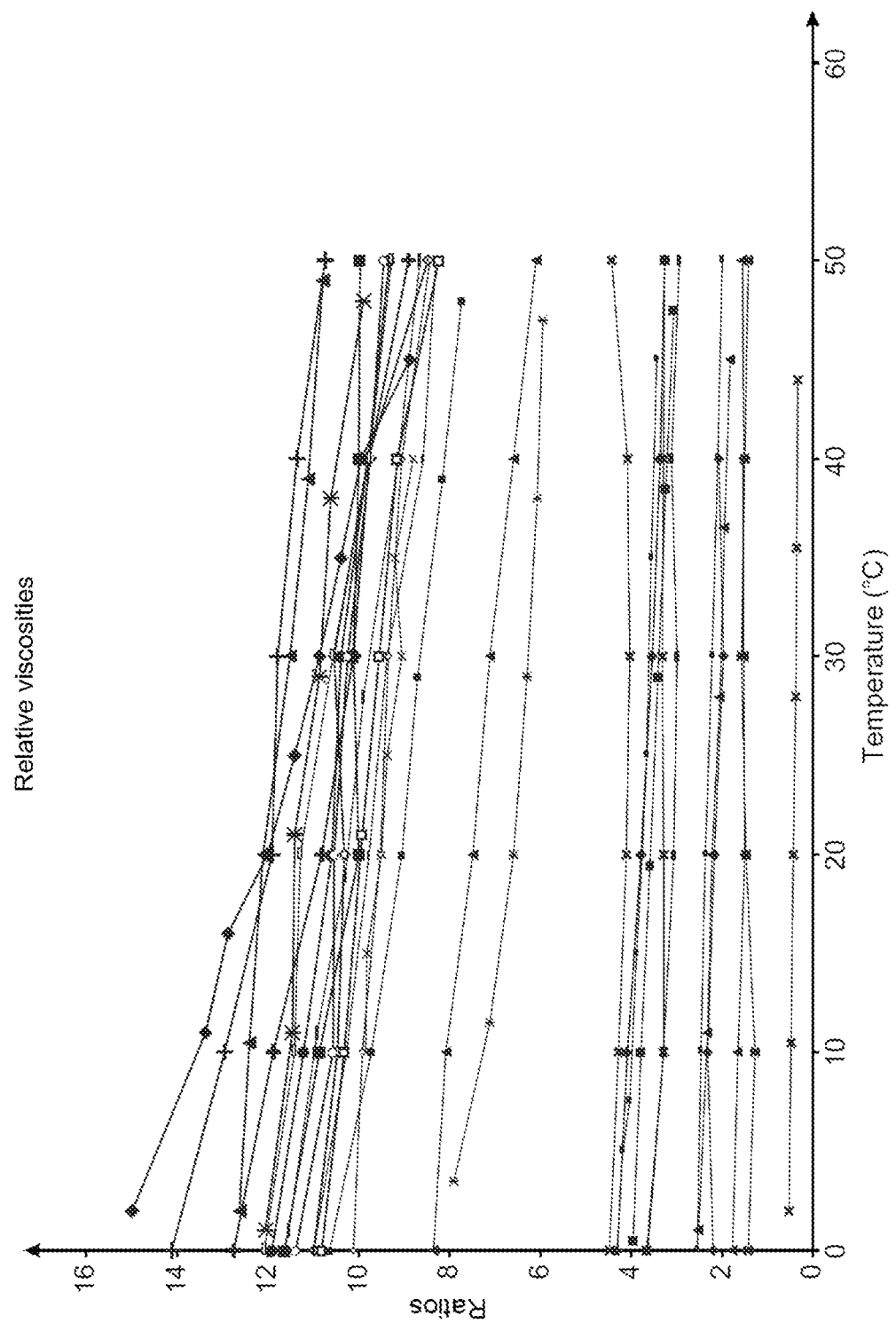

FIG. 5 is a graph which gives the reduced viscosity ($V_{reduced}$) or relative viscosity which is equal, at a given temperature, to the ratio of the viscosity of the ink to the viscosity of the solvent or of the mixture of solvents of this ink ($V_{reduced}=V_{ink}/V_{solvent}$) versus temperature (° C.), for 29 inks presently used in inkjet printers designated as 5312, 5506, FT265, 5311, 2550, 5153, 5151, 7540, FT128, 5135, 2323, 2702, 5532, 5137, 7703, FT184, 5144M, 2328, 5139, 9155, FT210, 2151, 2160, 5117, FT207, FT248, 2157, 2538 and 2588 inks.

Figure 6:
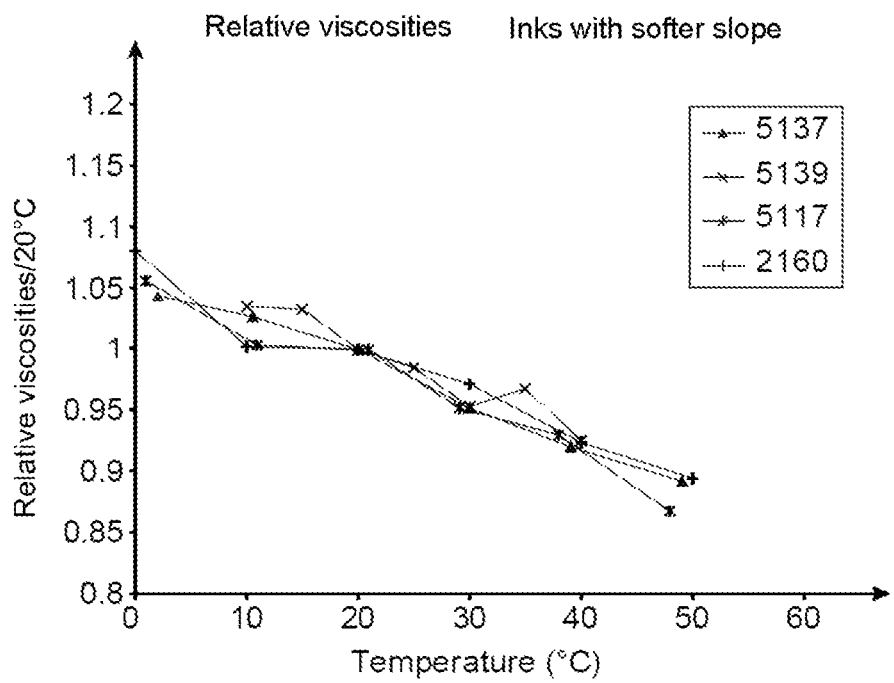

FIG. 6 is a graph which gives the ratio of the relative viscosity of the ink over the relative viscosity at 20° C. versus temperature (in ° C.) for 4 inks presently used in inkjet printers, so-called «gentle slope» (or "low slope" or "soft slope") inks.

These inks are the inks designated as 5137, 5139, 5117, and 2160 inks.

Figure 7:
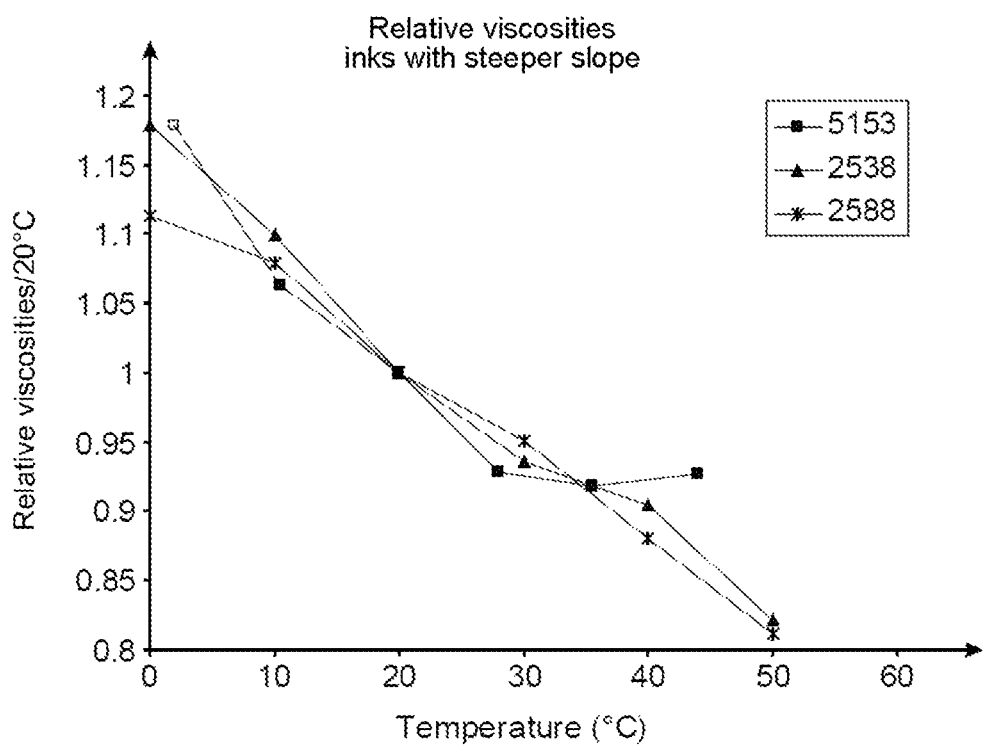

FIG. 7 is a graph which gives the ratio of the relative viscosity of the ink over the relative viscosity at 20° C. versus temperature (in ° C.) for 3 inks presently used in inkjet printers so-called «steep slope» inks.

These inks are the inks designated as 5153, 2538, and 2588 inks.

Figure 8:
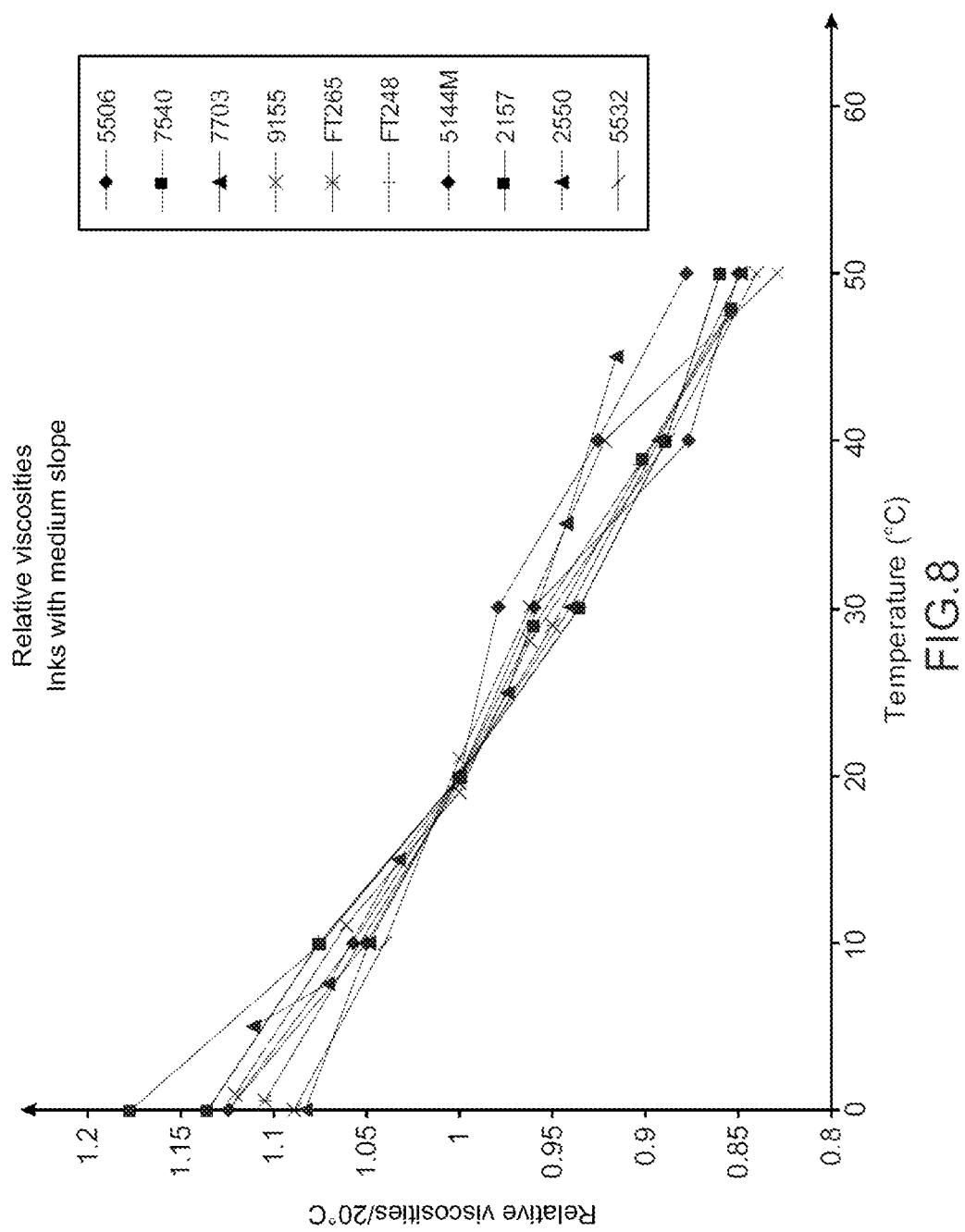

FIG. 8 is a graph which gives the ratio of the relative viscosity of the ink over the relative viscosity at 20° C. versus temperature (in ° C.) for 10 inks presently used in inkjet printers, so-called «medium slope» inks.

These inks are the inks designated as 5506, 7540, 7703, 9155, FT265, FT248, 5144 M, 2157, 2550, and 5532 inks.

Figure 9:
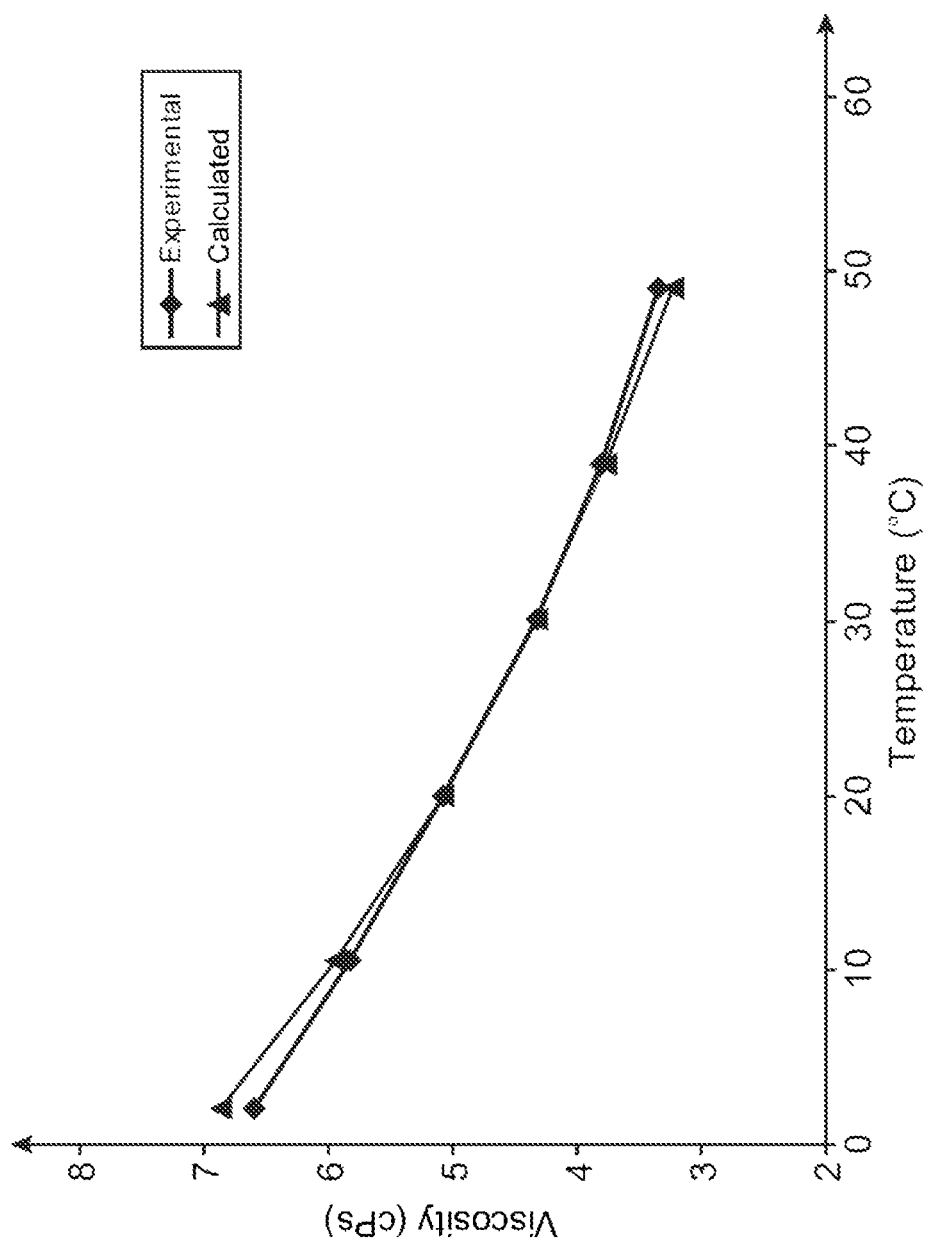

FIG. 9 is a graph which gives the measured experimental viscosity (in cPs), (points ♦) and the calculated viscosity according to the invention (points ▲) versus temperature (in ° C.) for an ink, designated as 5137 ink, with a «gentle slope», the essential solvent of which is MEK.

Figure 10:
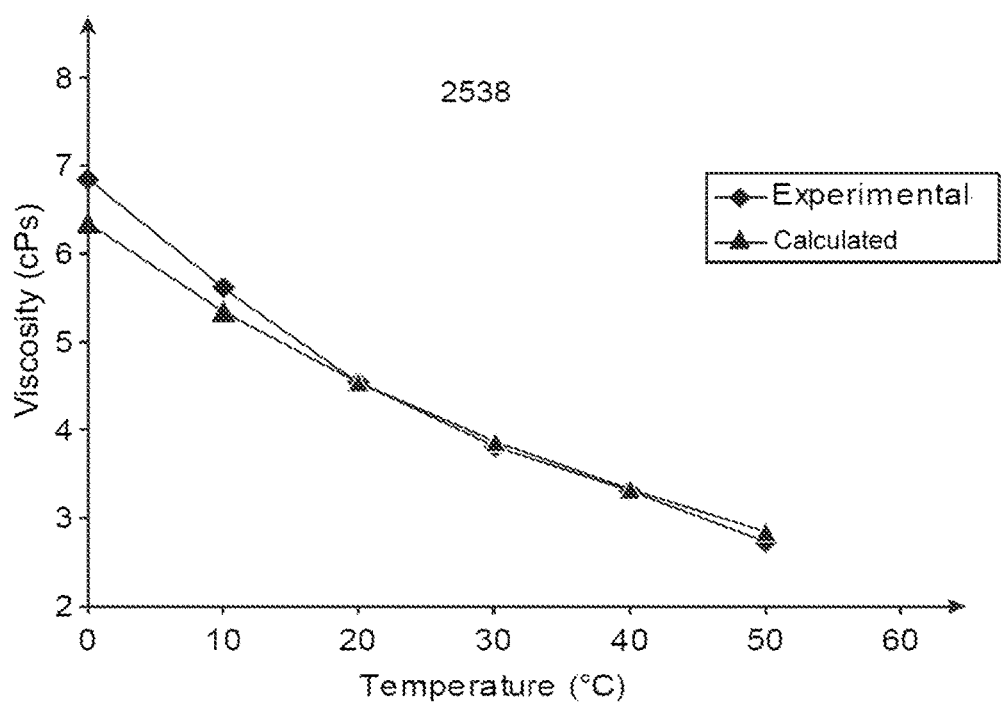

FIG. 10 is a graph which gives the measured experimental viscosity (in cPs), (points ♦) and the calculated viscosity according to the invention (points ▲) versus temperature (in ° C.) for an ink, designated as 2538 ink, with a «steep slope», the solvent of which is MEK.

Figure 11:
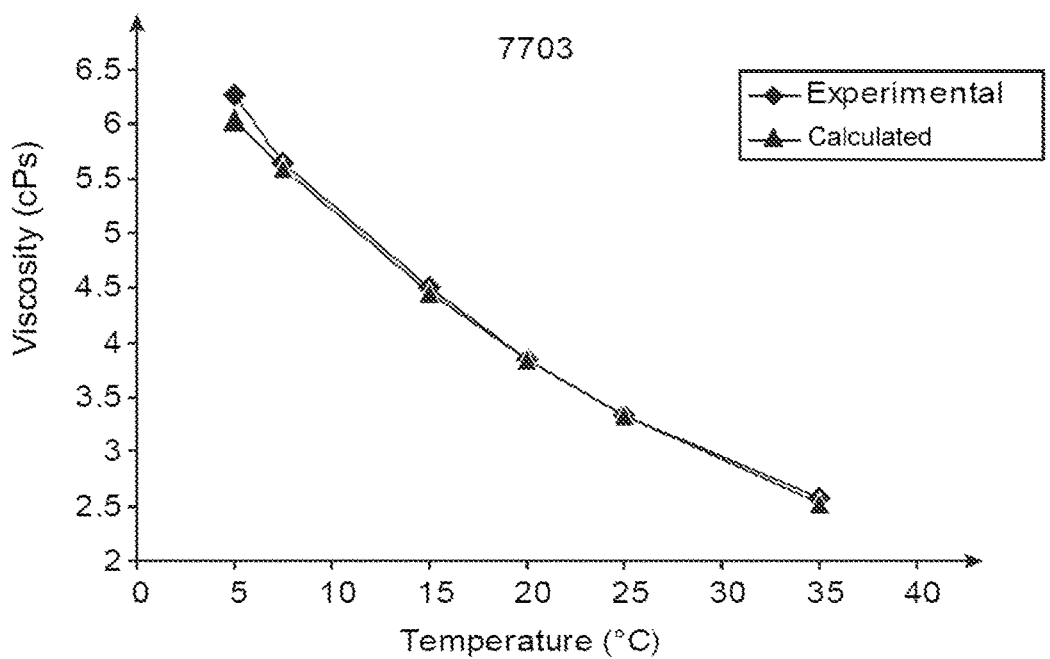

FIG. 11 is a graph which gives the measured experimental viscosity (in cPs), (points ♦) and the viscosity calculated according to the invention (points ▲) versus temperature (in ° C.) for an ink, designated as 7703 ink, the solvent of which is water.

Figure 12:
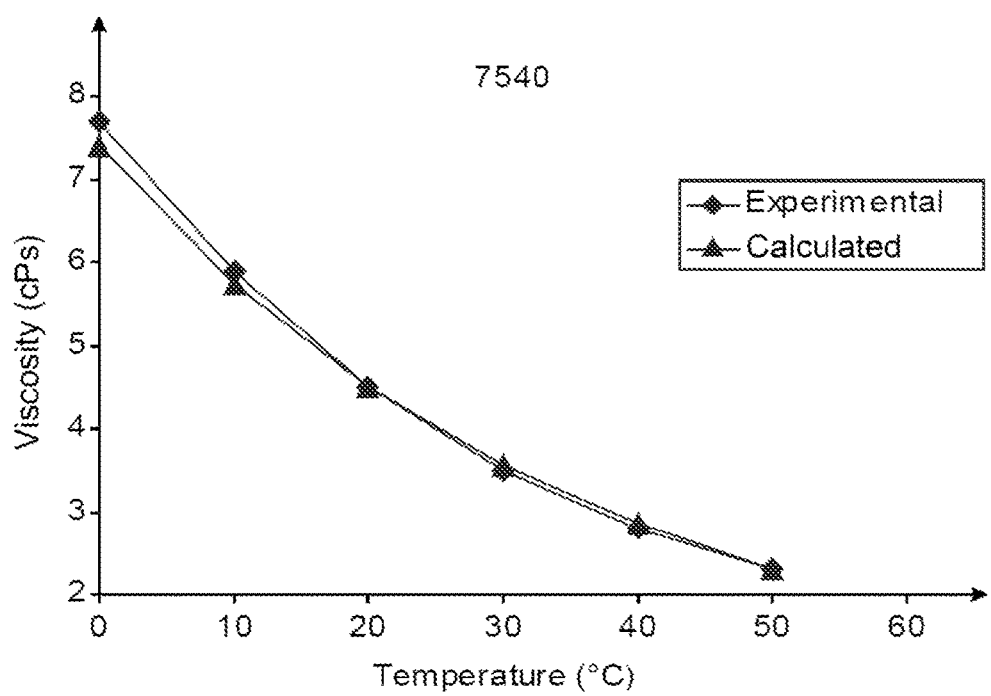

FIG. 12 is a graph which gives the measured experimental viscosity (in cPs), (points ♦) and the viscosity calculated according to the invention (points ▲) versus temperature (in ° C.) for an ink, designated as 7540 ink, the solvent of which is ethanol.

Figure 13:
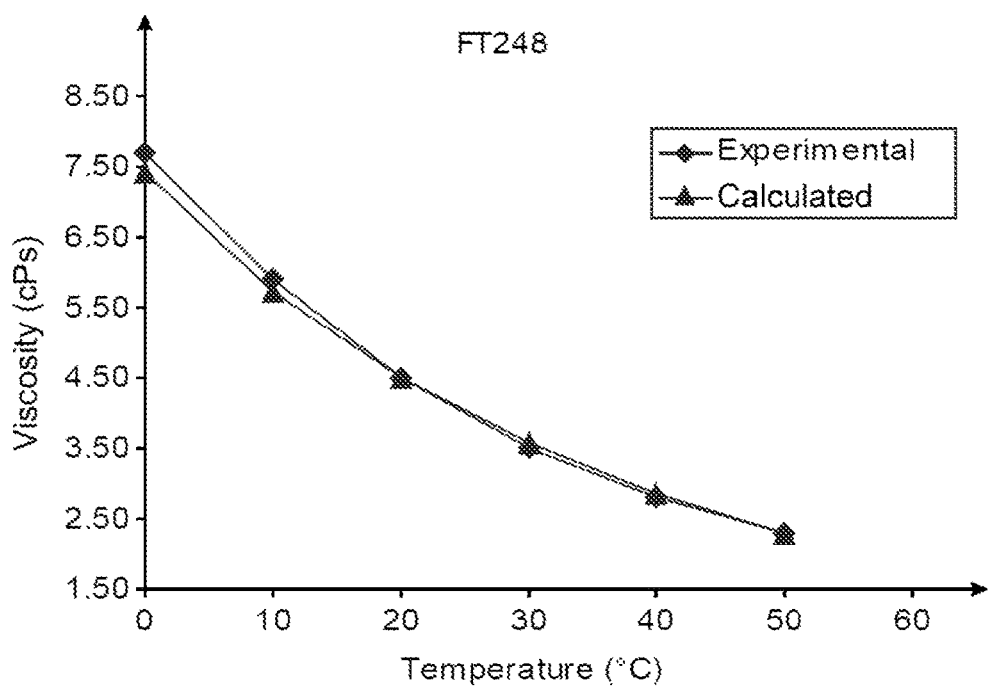

FIG. 13 is a graph which gives the measured experimental viscosity (in cPs), (points ♦) and the viscosity calculated according to the invention (points ▲) versus temperature (in ° C.) for an ink, designated as FT248 ink, the solvent of which is ethanol.

Figure 14:
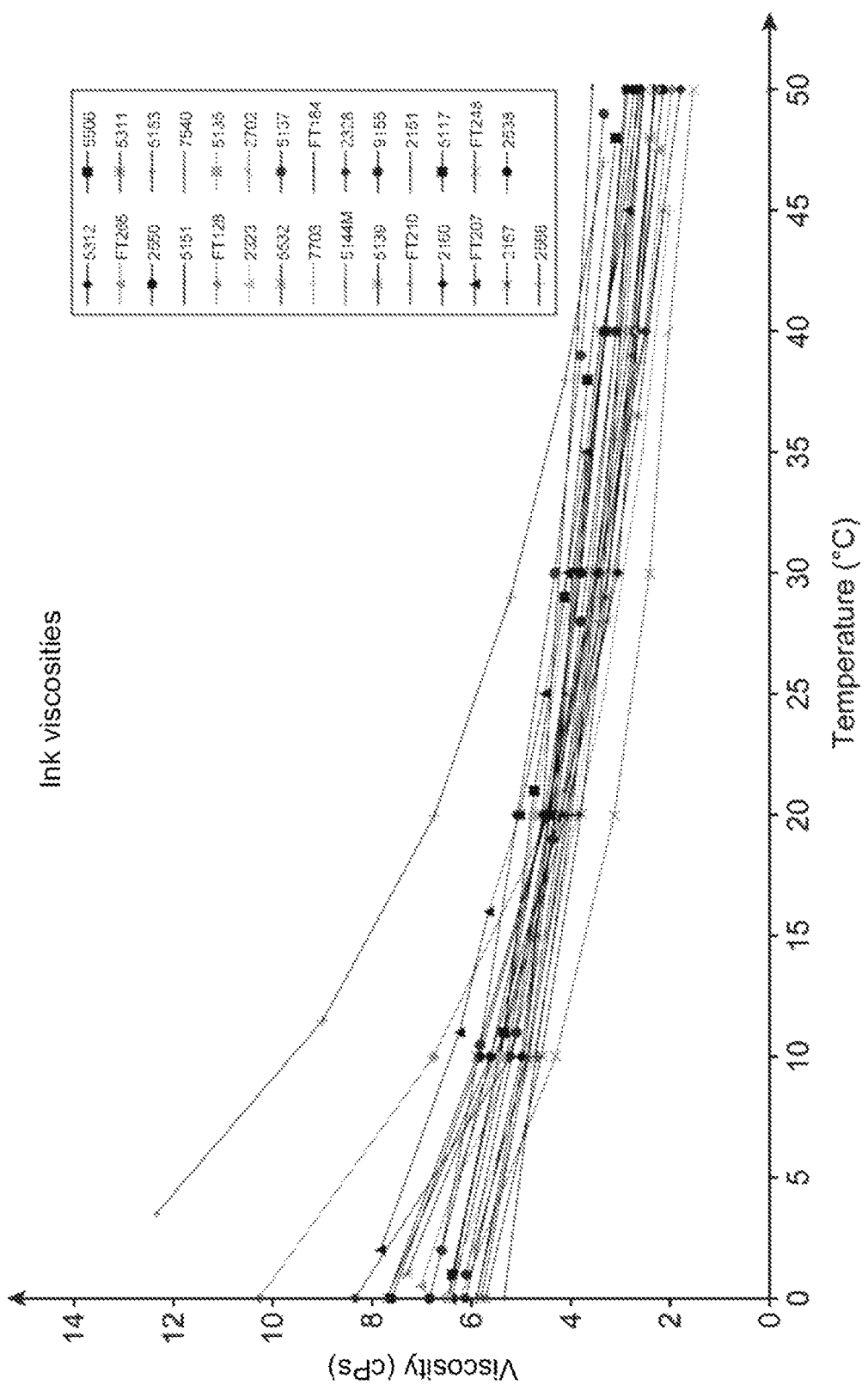

FIG. 14 is a graph which gives the viscosity (in cPs) versus temperature (in ° C.) of 29 different inks presently used in inkjet printers, designated as 5312, 5506, FT265, 5311, 2550, 5153, 5151, 7540, FT128, 5135, 2323, 2702, 5532, 5137, 7703, FT184, 5144M, 2328, 5139, 9155, FT210, 2151, 2160, 5117, FT207, FT248, 2157, 2538 and 2588 inks.

Figure 15:
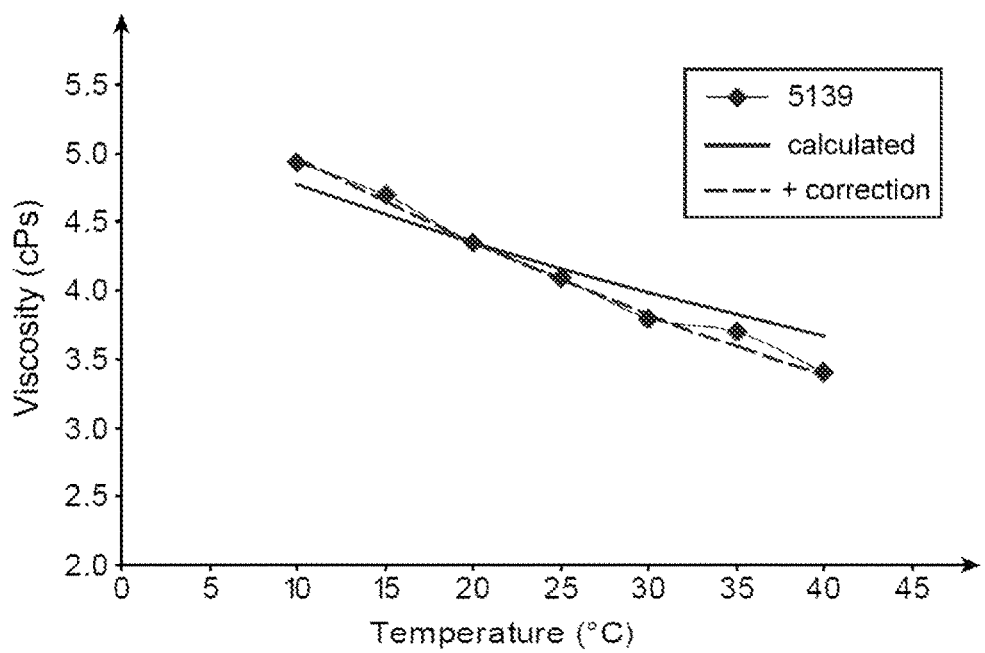

FIG. 15 is a graph which gives the measured experimental viscosity (in cPs), (points ♦, curve in thin solid line), the viscosity calculated according to the invention (curve in thick solid line), and the viscosity calculated according to the invention and further corrected by applying a correction factor (curve in dotted lines) versus temperature (in ° C.) for an ink, designated as 5139 ink, the solvent of which is the MEK/methoxypropanol acetate mixture mentioned above.

Figure 16:
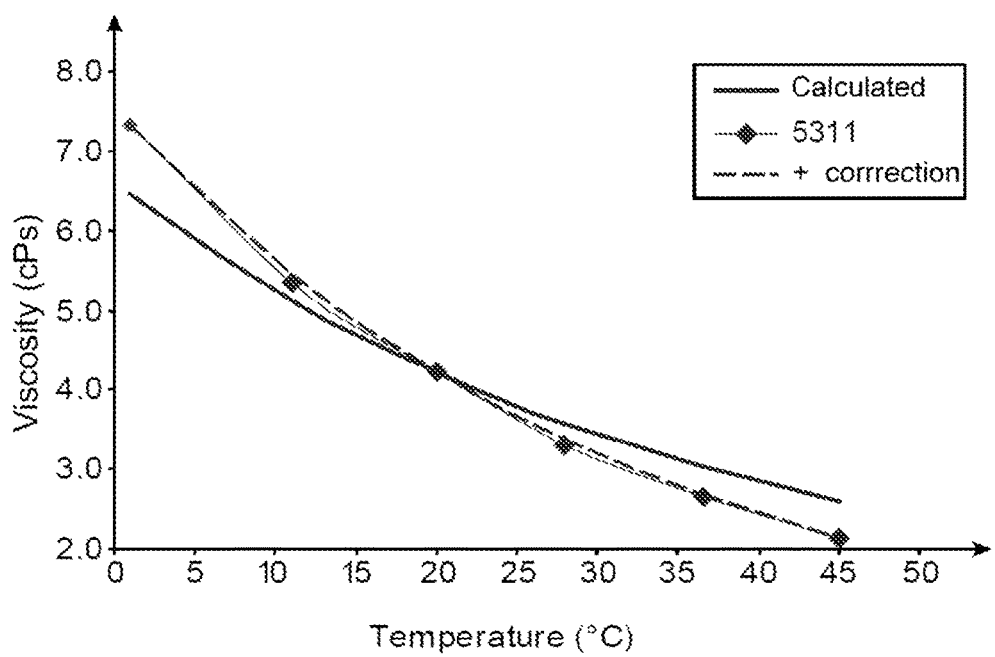

FIG. 16 is a graph which gives the measured experimental viscosity (in cPs), (points ♦, curve in thin solid line), the viscosity calculated according to the invention (curve in thick solid line), and the viscosity calculated according to the invention and further corrected by applying a correction factor (curve in dotted lines) versus temperature (in ° C.) for an ink, designated as 5311 ink, the solvent of which is the ethanol/1,2-propanediol mixture mentioned above.

Figure 17:
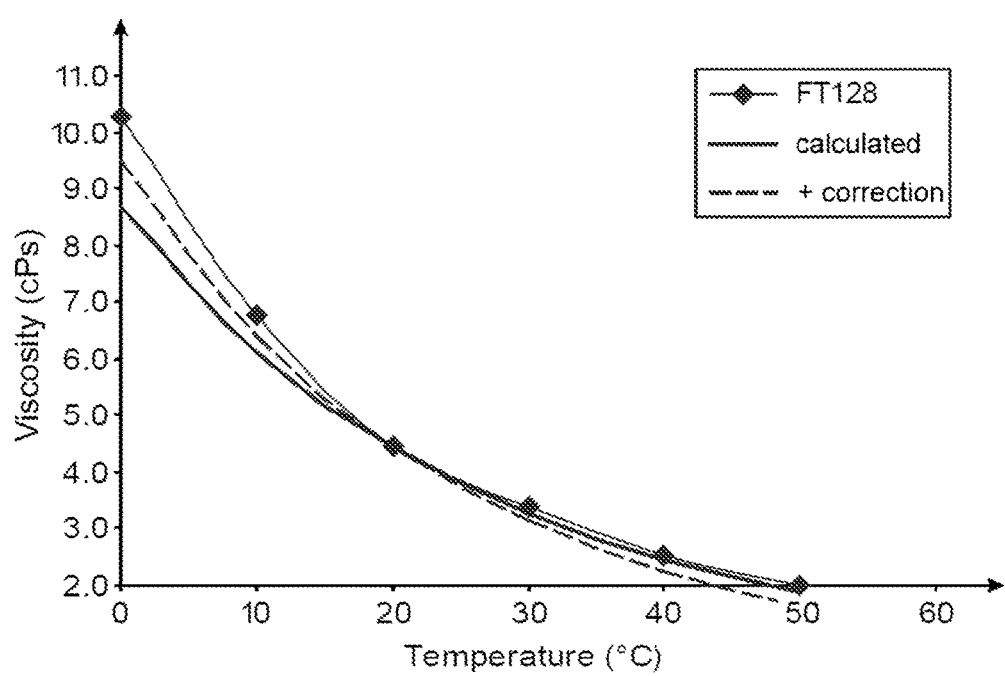

FIG. 17 is a graph which gives the measured experimental viscosity (in cPs), (points ♦, curve in thin solid line), the viscosity calculated according to the invention (curve in thick solid line), and the viscosity calculated according to the invention and further corrected by applying a correction factor (curve in dotted lines) versus temperature (in ° C.) for an ink, designated as FT128 ink, the solvent of which is the ethanol/water mixture mentioned above.

DETAILED DISCUSSION OF PARTICULAR EMBODIMENT

When the curves which give the viscosity versus temperature of the base solvents of the inks for inkjet printers such as water, alcohol (ethanol), and methyl ethyl ketone (MEK), which may be found in the literature, are examined, it is seen that the variations of the viscosity of the solvents versus temperature, are of the same order as those of the corresponding inks in relative values.

All the curves which give the viscosity versus temperature of the inks which are required for proper operation of the present inkjet printers were therefore collected.

More exactly, these are the raw data relating to viscosity versus temperature of 29 different inks designated as 5312, 5506, FT265, 5311, 2550, 5153, 5151, 7540, FT128, 5135, 2323, 2702, 5532, 5137, 7703, FT184, 5144M, 2328, 5139, 9155, FT210, 2151, 2160, 5117, FT207, FT248, 2157, 2538 and 2588 inks, which have been gathered on a same graph, FIG. 14.

On this graph it may be seen that the viscosities of the inks vary between 0 and 50° C. by a factor of about 2 to 4, and from 2 to more than 6 for certain inks.

As these inks do not have all the same viscosity at the reference temperature of 20° C., they may be compared more easily by dividing the viscosity at a temperature T by the viscosity at 20° C. for each ink.

The thereby obtained values were gathered on a same graph, which is not either reproduced here because of its complexity.

The curves which give the viscosity, versus temperature, of the 10 solvents, or mixtures of solvents of these inks are given in FIG. 1.

These curves were extracted from the literature or else, notably for the mixtures of solvents, established from viscosity measurements conducted in the laboratory.

These solvents are water, ethanol (EtOH), methyl ethyl ketone (MEK), MEK/EtOH/methoxypropanol acetate or PMA/Methanol (MeOH) mixture (68/26.6/1/4.4), the MEK/1,2-propanediol/water mixture, the EtOH/water mixture (1/1), the MEK/methoxypropanol acetate mixture (89/11), the methyl isopropyl ketone (MiPK), the EtOH/1,2 propanediol mixture (88/11) and the MEK/EtOH mixture (28/72).

A particular way for comparing these curves is to divide them by their viscosity at 20° C. In other words, the curves which give the viscosity at temperature T/viscosity at 20° C. ratio versus temperature T (in ° C.) of the aforementioned 10 solvents or mixtures of solvents are plotted (FIG. 2).

In order to be able to calculate the viscosity of the solvents at all the intermediate temperatures, it is possible to smooth these data by an equation of the Arrhenius type which is perfectly suitable over a reduced range of temperatures, such as the relevant range from 0° C. to 50° C.

The viscosity curve of each solvent which gives the viscosity versus temperature may therefore be described by an equation of the type $\eta = K \cdot e^{-E/RT}$ (1)

Either as a logarithm: $Ln(\eta) = Ln(K) - E/RT$ (2), wherein q is the dynamic viscosity (in cPs) and T is the temperature (in K).

It is therefore noted that only two parameters i.e. $Ln(K)$ and $-E/R$ are involved in this equation.

For each of these curves, the ordinate at the origin gives $Ln(K)$ and the slope gives $-E/R$.

FIG. 3 is a graph which gives the $Ln$(viscosity $\eta$) versus $1/T$ (in K) for the aforementioned 10 solvents or mixture of solvents used presently in inks for inkjet printers.

In the same way, the ratio of the viscosity of the solvent to the reference viscosity (for example at 20° C.) gives as logarithms: $Ln$ (viscosity at T/viscosity at 20° C.)=$Ln$ (viscosity)−$Ln$ (viscosity at 20° C.)=$Ln(K)$−$E/RT$−$Ln$ (viscosity at 20° C.).

FIG. 4 is a graph which gives the $Ln$ (viscosity at T/viscosity at 20° C.) versus $1/T$ (in K) of the 10 solvents or mixtures of solvents mentioned above presently used in inks for inkjet printers.

If the reduced viscosity ($V_{reduced}$), or relative viscosity (which is equal, at a given temperature, to the ratio of the viscosity of the ink to the viscosity of the solvent or of the mixture of solvents of this ink i.e. $V_{reduced} = V_{ink}/V_{solvent}$) is calculated at each of the temperatures, for the inks mentioned above presently used in inkjet printers, the relative viscosity curves of these inks are then obtained which are plotted in FIG. 5.

It may be seen that these relative, reduced viscosity curves of the inks are much more linear when they are compared with the viscosity curves for which the curvatures are very large (FIG. 14).

It may also be ascertained that the slopes of the curves of FIG. 5 are very similar.

If these relative, reduced viscosities are reduced to a common value at 20° C. by dividing them by the viscosity at 20° C., a graph is then obtained, which gives for each ink mentioned above the relative viscosity/relative viscosity at 20° C. ratio versus temperature (in ° C.).

This graph is not reproduced here because of its complexity.

It is seen on this graph that the essential portion of the variation of the viscosity of the ink stems from that of the solvent.

It then becomes clear that by calculating the relative viscosity, the contribution of the solvent to the effect of temperature is suppressed.

In other words, if the relative viscosity of an ink is measured versus temperature, the obtained curve is quasi flat, which shows that the variation of the viscosity with temperature is essentially due to the solvent and much less to the other ingredients of the ink such as the coloring agents and the pigments.

Indeed, the curves of this graph are close to straight lines with slopes generally comprised between −0.003 and −0.006° C.$^{-1}$.

For all these inks, the variation of the relative viscosity is not more than ±20% between 0 and 50° C., to be compared with the ratios mentioned earlier which were from 2 to more than 6.

If the bundle of curves, which gives for each ink the relative viscosity/relative viscosity at 20° C. ratio versus temperature (in ° C.), is now examined with more attention, it may be seen that there are:
- a few inks which show relatively gentle (low, soft) slopes of the ratio of viscosities, of less than −0.004° C.$^{-1}$ (FIG. 6).
- a few other inks with the steepest slopes, greater than −0.006° C.$^{-1}$ (FIG. 7).
- The greater number of inks with intermediate, medium, slopes, between −0.0045 and −0.006° C.$^{-1}$ (FIG. 8).

From these observations, it is possible to estimate relatively well the viscosity versus temperature curves by only knowing the viscosity at a single temperature and that of the solvent or of the mixture of solvents (it may even be sufficient to only know the viscosity of the majority solvent of the mixture of solvents) at all the desired temperatures, i.e. generally in the range of operating temperatures of the inkjet printer, for example from 0° C. to 50° C.

In other words, according to the invention, the viscosity curve of an ink, for example from 0 to 50° C. may be determined by only 3 parameters and optionally 4 parameters, instead of a complete curve, i.e.:
- the viscosity of the ink at 20° C.;
- the viscosity parameters of the solvent: Ln(K) and −E/R.

If greater accuracy is desired, then a fourth parameter is used: the slope correction factor k.

In a simplified embodiment wherein the viscosity of the ink may be approximated to within ±20%, only 3 factors, parameters, are required and sufficient. For greater accuracy, i.e. ±10% or better ±5%, a 4$^{th}$ factor, i.e. the correction factor k, is required.

The calculation of the viscosity of an ink at a temperature T may be expressed in generic terms as follows:

Let $\eta_{eT}$ be the viscosity of the ink at temperature T;

$\eta_{eTref}$ be the viscosity of the ink at the reference temperature $T_{ref}$ (for example 20° C.);

$\eta_{sT}$ be the viscosity of the solvent at temperature T;

$\eta_{sTref}$ be the viscosity of the solvent at the reference temperature $T_{ref}$ (for example 20° C.);

$\eta r_{eT}$ be the relative viscosity of the ink at temperature T;

$$\eta r_{eT} = \eta_{eT}/\eta_{sT}$$

and in the same way $\eta r_{eTref}$ is the relative restricted viscosity of the ink at the reference temperature $T_{ref}$ (for example 20° C.).

The ratio $\eta_{eT}/\eta_{eTref}$ is a function of the temperature f(T)

It was shown that:

$$\eta r_{eT}/\eta r_{eTref} = 1 - k \times (T - Tref)$$

The ratio $$\eta r_{eT}/\eta r_{eTref} = \eta_{eT}/\eta_{sT} \times \eta_{sTref}/\eta_{eTref} = f(T) \times \eta_{sTref}/\eta_{sT}$$

Whence:

In a first approximation with $\eta r_{eT}/\eta r_{eTref} = 1$ $$\eta_{eT} = \eta_{eTref} \times \eta_{sT}/\eta_{sTref}$$

and by adding the correction on $$\eta r_{eT}/\eta r_{eTref} = 1 - k \times (T - Tref)$$

$$\eta_{eT} = \eta_{eTref} \times \eta_{sT}/\eta_{sTref} \times (1 - k \times (T - Tref))$$

with $$\eta_{sT} = K \cdot e^{-E/RT}$$

$$\eta_{sTref} = K \cdot e^{-E/RTref}$$

It is therefore possible to calculate the viscosity curve of an ink at a temperature T only from:
1. the viscosity of the ink at a single temperature ($T_{ref}$).
2. the ratio of the viscosity of the solvent at the same temperature T, to the viscosity of the solvent at the reference temperature $T_{ref}$.

This calculation is carried out with an approximation of about ±20%.

For a better approximation, it is possible to add the correction factor k.

EXAMPLES

In the following examples, the method according to the invention is applied to the calculation of the viscosity of various inks for inkjet printers.

In order to calculate the viscosity of an ink at a given temperature T, the method is simple:
1. Multiply the viscosity of the ink at the reference temperature (20° C. for example), by the ratio of the viscosity of the solvent at the same temperature T to the viscosity of the solvent at the reference temperature (20° C.).
2. Optionally correct the result by multiplying it by $(1 - k \times (T - T_{ref}))$, wherein k is a correction factor such as 0.0047, rounded to 0.005.

The value of the correction factor k, for example k=0.0047 (rounded to 0.005) is obtained as discussed above, by averaging the values of the correction factors ki to be applied to the viscosity calculated at a given temperature in order to obtain the real viscosity actually measured at this temperature, on a given ink set representative of the inks.

In the following examples, the calculation method according to the invention as discussed above is applied to various inks by assuming a correction factor k (average correction factor) of 0.0047. 0.0047 is an average value of the correction factor for all the tested inks and may be rounded to 0.005.

Example 1

In this example, the calculation method according to the invention, as discussed above, is applied to an ink with a «gentle slope» designated as 5137, the solvent of which is MEK.

FIG. 9 gives the measured experimental viscosity (in cPs) (points ♦) and the viscosity calculated according to the invention (points ▲) versus temperature (° C.) for this ink.

Example 2

In this example, the calculation method according to the invention, as discussed above, is applied to an ink with a «steep slope» designated as 2538, for which the solvent is MEK.

FIG. 10 gives the measured experimental viscosity (in cPs) (points ♦) and the viscosity calculated according to the invention (points ▲) versus temperature (° C.) for this ink.

Example 3

In this example, the calculation method according to the invention, as discussed above, is applied to an ink designated as 7703, for which the solvent is water.

FIG. 11 gives the measured experimental viscosity (in cPs) (points ♦) and the viscosity calculated according to the invention (points ▲) versus temperature (° C.) for this ink.

Example 4

In this example, the calculation method according to the invention, as discussed above, is applied to an ink designated as 7540, for which the solvent is alcohol.

FIG. 12 gives the measured experimental viscosity (in cPs) (points ♦) and the viscosity calculated according to the invention (points ▲) versus temperature (° C.) for this ink.

Example 5

In this example, the calculation method according to the invention, as discussed above, is applied to an ink designated as FT248, for which the solvent is alcohol.

FIG. 13 gives the measured experimental viscosity (in cPs) (points ♦) and the viscosity calculated according to the invention (points ▲) versus temperature (° C.) for this ink.

Example 6

In this example, the calculation method according to the invention, as discussed above, is applied to an ink designated as 5139, for which the solvent is the MEK/methoxypropanol acetate mixture mentioned above.

FIG. 15 gives the measured experimental viscosity (in cPs) (points ♦, curve in thin solid line), the viscosity calculated according to the invention (curve in thick solid line), and the viscosity calculated according to the invention and further corrected by applying a correction factor (curve in dotted lines) versus temperature (in ° C.) for this ink.

Example 7

In this example, the calculation method according to the invention, as discussed above, is applied to an ink designated as 5311, for which the solvent is the alcohol/1,2-propanediol mixture mentioned above.

FIG. 16 gives the measured experimental viscosity (in cPs) (points ♦, curve in thin solid line), the viscosity calculated according to the invention (curve in thick solid line), and the viscosity calculated according to the invention and further corrected by applying a correction factor (curve in dotted lines) versus temperature (in ° C.) for this ink.

Example 8

In this example, the calculation method according to the invention, as discussed above, is applied to an ink designated as FT128, for which the solvent is the alcohol/water mixture mentioned above.

FIG. 17 gives the measured experimental viscosity (in cPs) (points ♦, curve in thin solid line), the viscosity calculated according to the invention (curve in thick solid line), and the viscosity calculated according to the invention and further corrected by applying a correction factor (curve in dotted lines) versus temperature (in ° C.) for this ink.

Examples 1 to 8 provided above show that the method according to the invention gives excellent results since it is ascertained that the measured experimental viscosity curves and the curves giving the viscosity calculated according to the invention, and a fortiori the curves giving the viscosity calculated and further corrected according to the invention quasi coincide or are very close to each other.

These examples further show that excellent results are obtained with the method according to the invention regardless of the solvent of the ink whether this is water, MEK or alcohol or mixtures of solvents, and regardless of the ink and of the ingredients thereof other than the solvent.

The invention claimed is:

1. A method for managing quality of an ink of an inkjet printer versus temperature resorting to management of a viscosity of the ink versus temperature, said ink comprising a solvent or a mixture of solvents, and said solvent or mixture of solvents representing at least 50% by mass of the total mass of the ink, the method comprising:

during operation of the printer, measuring the viscosity and temperature T of the ink of the inkjet printer;

calculating a desired viscosity of the ink at the measured temperature T;

comparing the measured viscosity of the ink at the measured temperature T with the calculated desired viscosity of the ink at the measured temperature T; and when the measured viscosity of the ink is greater than the calculated desired viscosity of the ink, adding solvent or a mixture of solvents into the ink so that the measured viscosity of the ink is equal to the calculated desired viscosity of the ink, and when the measured viscosity of the ink is less than the calculated desired viscosity of the ink, waiting until the solvent or the mixture of solvents evaporates so that the measured viscosity of the ink is equal to the calculated desired viscosity of the ink, wherein the desired viscosity of the ink at the measured temperature T is calculated from the following parameters:

the viscosity of the ink at a single reference temperature Tref;

the parameters K or Ln(K), and −E/R of the following equation giving the viscosity of the solvent or of the mixture of solvents: $Ln(\text{viscosity of the solvent}) = Ln(K) - E/RT$, and wherein E is the Arrhenius activation energy given in J/mol, and R is the ideal gas constant.

2. The method according to claim 1, wherein the calculated desired viscosity of the ink is further calculated by using a correction factor k.

3. The method according to claim 1, wherein the ink further comprises at least one coloring material.

4. The method according to claim 1, wherein the ink comprises from 50% to 95% by mass of the solvent or of the mixture of solvents based on the total mass of the ink.

5. The method according to claim 1, wherein the viscosity of the ink at the reference temperature Tref is obtained by a measurement carried out in a laboratory.

6. The method according to claim 1, wherein the reference temperature Tref is 20° C.

7. The method according to claim 1, wherein the equation giving the viscosity of the solvent or of the mixture of solvents: Ln (viscosity of the solvent)=Ln(K)−E/RT is determined by measuring the viscosity of the solvent or of the mixture of solvents at several temperatures located in the range of operating temperatures of the printer.

8. The method according to claim 1, wherein the viscosity of the ink at the temperature T is calculated by multiplying the viscosity of the ink at the reference temperature Tref by the ratio of the viscosity of the solvent or of the mixture of solvents at temperature T to the viscosity of the solvent or of the mixture of solvents at the reference temperature Tref.

9. The method according to claim 1, wherein the viscosity of each of the inks used in the printer at the reference temperature Tref, and the parameters K or Ln(K), and −E/R of the equation giving the viscosity of the solvent or of the mixture of solvents of each of said inks are stored in the machine memory of the printer, and the method further comprises establishing a curve of variation of the viscosity of the ink in the range of operating temperatures of the printer.

10. The method according to claim 2, wherein the correction factor k has a value between $5.10^{-3}$ and $10^{-2}$.

11. The method according to claim 2, wherein the correction factor k is determined by:
  measuring the viscosity of each ink of a set of inks used in a printer at at least two temperatures, including the reference temperature $T_{ref}$, selected in the range of operating temperatures of the printer;
  calculating the viscosity of each of the inks of the set of inks at said at least two temperatures, selected in the range of operating temperatures of the printer;
  for each of the inks of the set of inks, determining a correction factor ki, the correction factor ki having a value such that multiplying the calculated viscosity of the ink by (1−ki) renders the measured viscosity;
  averaging all the determined factors ki for all the temperatures and all the inks of the set of inks, the factor k being the average.

12. The method according to claim 2, wherein the correction factor k is stored in the machine memory of the printer.

13. The method according to claim 2, wherein the viscosity of the ink at temperature T is calculated by multiplying the viscosity of the ink at the reference temperature Tref by the ratio of the viscosity of the solvent or of the mixture of solvents at temperature T to the viscosity of the solvent or of the mixture of solvents at the reference temperature Tref and further by (1−k(T−Tref)), wherein k is the correction factor.

* * * * *

UNITED STATES PATENT AND TRADEMARK OFFICE
CERTIFICATE OF CORRECTION

PATENT NO. : 10,144,216 B2
APPLICATION NO. : 14/844532
DATED : December 4, 2018
INVENTOR(S) : Pierre De Saint Romain It is certified that error appears in the above-identified patent and that said Letters Patent is hereby corrected as shown below:

In the Specification

Column 8, Line 28, "Either as a logarithm: Ln ($\eta$) = Ln(K)-E/RT (2), wherein q" should read -- Either as a logarithm: Ln ($\eta$) = Ln(K)-E/RT (2), wherein $\eta$ --

Signed and Sealed this
Nineteenth Day of February, 2019

Andrei Iancu
*Director of the United States Patent and Trademark Office*